United States Patent
Chen et al.

(10) Patent No.: US 9,975,796 B2
(45) Date of Patent: May 22, 2018

(54) PROCESS, APPARATUS AND MEMBRANE BIOREACTOR FOR WASTEWATER TREATMENT

(75) Inventors: Guanghao Chen, Hong Kong (CN); Peng Bai, Hong Kong (CN); Ho Kwong Chui, Hong Kong (CN)

(73) Assignee: THE HONG KONG UNIVERSITY OF SCIENCE AND TECHNOLOGY, Kowloon, Hong Kong (CN)

( * ) Notice: Subject to any disclaimer, the term of this patent is extended or adjusted under 35 U.S.C. 154(b) by 386 days.

(21) Appl. No.: 13/994,403

(22) PCT Filed: Dec. 16, 2011

(86) PCT No.: PCT/CN2011/002113
§ 371 (c)(1),
(2), (4) Date: Jun. 14, 2013

(87) PCT Pub. No.: WO2012/079288
PCT Pub. Date: Jun. 21, 2012

(65) Prior Publication Data
US 2013/0264282 A1     Oct. 10, 2013

Related U.S. Application Data

(60) Provisional application No. 61/459,597, filed on Dec. 16, 2010.

(51) Int. Cl.
*C02F 3/30* (2006.01)
*C02F 3/02* (2006.01)
(Continued)

(52) U.S. Cl.
CPC .............. *C02F 3/30* (2013.01); *B01D 63/082* (2013.01); *C02F 3/1273* (2013.01); *C02F 3/302* (2013.01);
(Continued)

(58) Field of Classification Search
CPC .............. B01D 2311/16; B01D 61/147; B01D 2321/185; B01D 2311/2649;
(Continued)

(56) References Cited

U.S. PATENT DOCUMENTS 5,733,455 A * 3/1998 Molof et al. .................. 210/605
7,517,454 B2 * 4/2009 Hu et al. ....................... 210/620
(Continued)

FOREIGN PATENT DOCUMENTS

JP       2002001028 A     1/2002
JP       2002153714 A     5/2002
(Continued)

OTHER PUBLICATIONS

Streicher and Ophardt, "Waste Water Treatment Plant Elmhurst, Illinois a Virtual Tour", Elmhurst College (1999-2003).
(Continued)

*Primary Examiner* — Claire A Norris
(74) *Attorney, Agent, or Firm* — Nath, Goldberg & Meyer; Jerald L. Meyer; Stanley N. Protigal (57) ABSTRACT

Wastewater influent is supplied to an aeration zone having a membrane module. Activated sludge is established in the aeration zone and an oxygen surplus is maintained by controlling a rate of oxygen supplied to the aeration zone. Wastewater influent is mixed with the activated sludge to form a first mixed liquid. A portion of the first mixed liquid is filtered to form a filtrate and unfiltered activated sludge. The unfiltered activated sludge is mixed with the activated sludge in the aeration zone to form the first mixed liquid. A portion of the first mixed liquid is transferred from the aeration zone to an anaerobic zone, and a second portion of first mixed liquid is mixed with activated sludge in the anaerobic zone to form a second mixed liquid. The second mixed liquid is recycled to the aerobic zone.

20 Claims, 7 Drawing Sheets
(1 of 7 Drawing Sheet(s) Filed in Color)

(51) Int. Cl.
*B01D 61/00* (2006.01)
*C02F 3/12* (2006.01)
*B01D 63/08* (2006.01)
*C02F 3/20* (2006.01)

(52) U.S. Cl.
CPC .. *B01D 2311/2688* (2013.01); *B01D 2313/12* (2013.01); *B01D 2313/26* (2013.01); *B01D 2315/06* (2013.01); *C02F 3/201* (2013.01); *C02F 2209/22* (2013.01); *C02F 2303/20* (2013.01); *C02F 2303/24* (2013.01); *Y02W 10/15* (2015.05)

(58) Field of Classification Search
CPC ............... B01D 2313/20; B01D 65/02; B01D 2239/065; C02F 3/1268; C02F 3/1273; C02F 3/1221; C02F 1/001; C02F 1/444; C02F 3/30; C02F 3/302
USPC .......................... 210/605, 620, 623, 630, 650
See application file for complete search history.

(56) References Cited

U.S. PATENT DOCUMENTS

| | | | |
|---|---|---|---|
| 2003/0159990 A1* | 8/2003 | Collins | B01D 61/04 210/615 |
| 2003/0192825 A1* | 10/2003 | Chang | B01D 39/1623 210/483 |
| 2004/0035786 A1* | 2/2004 | Goldsmith | B01D 61/18 210/631 |
| 2007/0051677 A1* | 3/2007 | Curtis et al. | 210/623 |
| 2008/0223783 A1 | 9/2008 | Sutton | |
| 2009/0218299 A1* | 9/2009 | Cote et al. | 210/791 |
| 2010/0282654 A1* | 11/2010 | Hauschild | C02F 3/1268 210/151 |

FOREIGN PATENT DOCUMENTS

| JP | 2004148242 A | | 5/2004 |
|---|---|---|---|
| JP | 2006055849 A | | 3/2006 |
| WO | WO2008/115444 | * | 9/2008 |

OTHER PUBLICATIONS

Waste Water Treatment Plant Elmhurst, Illinois a Virtual Tour, City of Elmhurst, downloaded Feb. 11, 2016.

* cited by examiner

PROCESS, APPARATUS AND MEMBRANE BIOREACTOR FOR WASTEWATER TREATMENT

This is a National Phase Application filed under 35 U.S.C. 371 of PCT/CN2011/002013, filed Dec. 16, 2011, which claims priority benefit under 35 USC 119(e) from U.S. Provisional Patent Application No. 61/459,597, filed Dec. 16, 2010, the content of each of which is hereby incorporated by reference in its entirety.

BACKGROUND

Field

This disclosure relates to treatment of wastewaters containing organic matter and nitrogen by using a new category of membrane bioreactor. In particular, the disclosure relates to a high flux, non-fouling membrane module. The disclosure also relates to a process whereby sulfate reduction is used in an anaerobic zone to reduce excess sludge production.

Background

Figure 1:
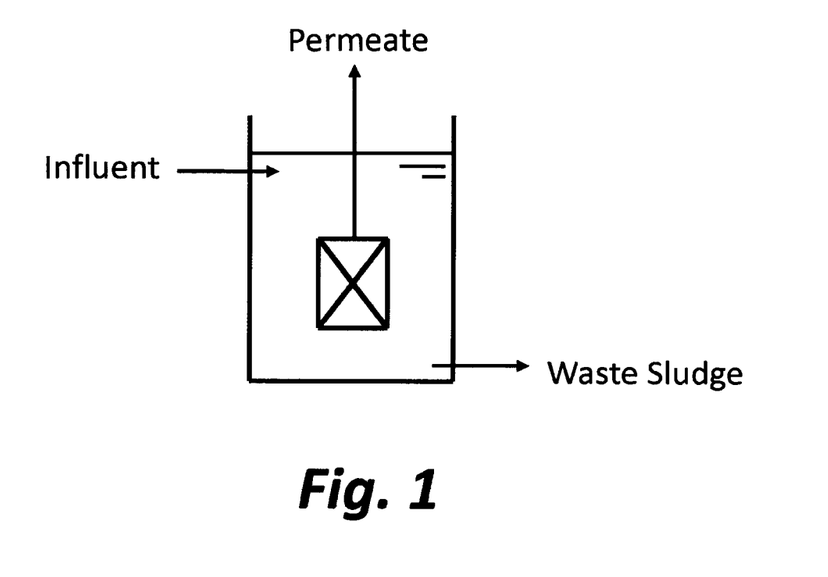
FIG. 1 is a schematic diagram showing a typical membrane bioreactor.

A Membrane Bioreactor (MBR), depicted in FIG. 1, is a type of biological wastewater treatment process. It operates in the mode of activated sludge, i.e., using a suspended growth of biological floc, also known as sludge, composed of bacteria and protozoa processes to oxidize organic carbon in the wastewater. Nevertheless, instead of using a sedimentation process to separate the sludge from the mixed liquid, the MBR process makes use of microfiltration membranes with typical pore size of 0.1 μm to 1 μm to separate the sludge from the mixed liquid. The permeate flux across the membrane is limited to below 1 m$^3$ per m$^2$ of membrane per day.

To ensure proper functioning of the membrane, special operations have to be arranged to prevent biofouling of the membrane. These include keeping the air-to-water ratio above 25 to provide sufficient self-cleaning of the membranes; frequent backwashing of the membrane once every 30 minutes; and periodic chemical or off-tank cleaning of the membrane every one or two months. All these special operations would result in the increase in energy consumption and operation cost, as well as reduction of effective operational duration. Moreover, to protect the membrane, the influent wastewater has to pass through primary sedimentation and fine-screening of 1 mm before the entering the aeration tank.

Solids retention time (SRT) is the average time the sludge stays in the system, and can be defined by:

$$\frac{\text{total amount of sludge}}{\text{(sludge wastage rate, including solids in the effluent)}}$$

Hydraulic retention time (HRT), sometimes called "hydraulic residence time", is the average time the water stays in the system, and can be defined by:

$$\frac{\text{total volume}}{\text{influent flow rate}}$$

The MBR process normally operates at a hydraulic retention time (HRT) of over 6 hrs and has a soluble Chemical Oxygen Demand (COD) removal efficiency similar to a conventional activated sludge process.

Although a number of sludge production minimizing processes have been developed recently, these processes lead to either high costs or the need for more space. The best option for sludge minimization is using a process which inherently has low sludge production. For COD conversion, low sludge production can be achieved by using hydrolysis and methanogenic fermentation or using sulfate as the electron acceptor instead of oxygen or nitrate.

Figure 2:
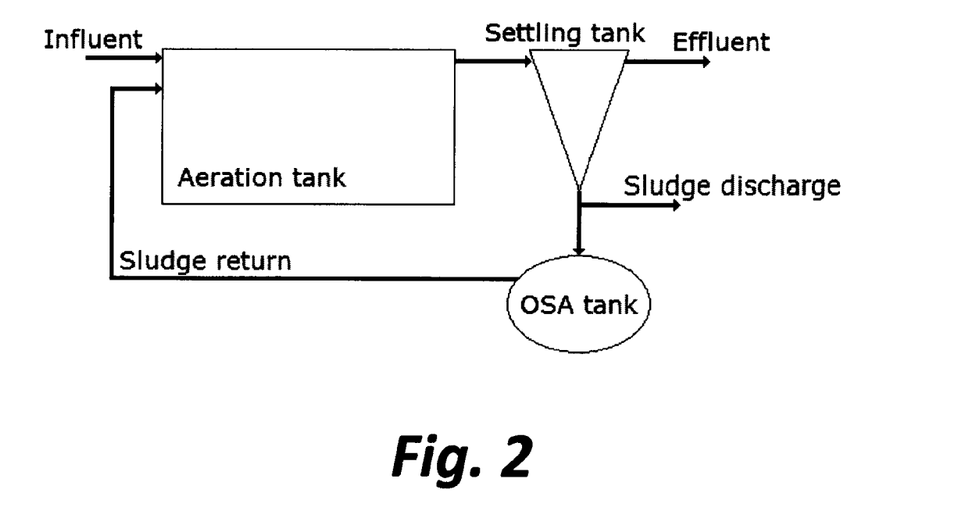
FIG. 2 is a schematic diagram showing a typical activated sludge-OSA process.

Oxic-Settling-Anaerobic (OSA) is a wastewater treatment technique employing an anaerobic zone or tank, and is capable of efficiently reducing sludge production and improving the stability of process operation by adding an anaerobic sludge tank in the sludge return line. In an OSA process, depicted in FIG. 2, two biological reactors and a settling tank are needed, which requires a larger real estate footprint. The hydraulic retention time (HRT) for OSA process is usually in excess of 4 hours to reduce the production of excess sludge and remove organic matters.

The Membrane Enhanced Primary Treatment (MEPT) is a wastewater treatment process that resembles a membrane bioreactor (MBR) without primary sedimentation, hence its performance effectively combines a primary sedimentation and MBR process.

SUMMARY

A wastewater treatment process is used for treating organic matter and nitrogen contained in the wastewater in a short hydraulic retention time (HRT), minimizing excess sludge, and maintaining a "macrofiltration" membrane module in a high flux operation condition. An aeration zone having the membrane module is provided. Wastewater influent is received and treated with activated sludge in the aeration zone. An oxygen surplus is maintained by controlling a rate of oxygen supplied to the aeration zone. The wastewater influent is mixed with the activated sludge in the aeration zone to form a first mixed liquid. The first mixed liquid is processed in two portions. A first portion of the first mixed liquid is filtered through a membrane forming a permeate as the effluent. A second portion is transferred from the aeration zone to an anaerobic zone forming a second mixed liquid. An equal volume of the second mixed liquid is recycled back to the aerobic zone.

BRIEF DESCRIPTION OF THE DRAWINGS

The file of this patent contains at least one drawing executed in color. Copies of this patent with color drawings will be provided by the Office upon request and payment of the necessary fee.

FIGS. 4a-4f are diagrams showing the biomass accumulated on the surface of the membranes with nominal pore sizes from 0.5 μm to 220 μm, viewed under a Confocal Laser Scanning Microscope (CLSM).

DETAILED DESCRIPTION

Overview

As used herein, the terms "aeration zone" and "tank with a continuous oxygen surplus" refer to a zone having a continuous oxygen surplus maintained, e.g., by controlling the rate of aeration such that the rate of oxygen supplied is equal to the rate of oxygen consumed by the microorganisms in the tank.

The disclosed technology provides a process for treating wastewater containing organic matter, using a new type of membrane (module) for solids separation. The process comprises introducing wastewater influent into an oxygen-surplus aeration zone having activated sludge and one or more membrane modules. The influent is mixed with the activated sludge in the aeration zone to form a mixed liquid. Treated effluent is taken out of the reactor by means of a vacuum pump filtering through the membrane.

In the conventional MBR process, microfiltration or ultrafiltration membranes with pore sizes of 0.1 µm to 1 µm or less are used. In contrast, the membranes used in the presently disclosed technology have pore sizes of 5 µm to 150 µm, which may be referred to as a "macrofiltration membrane". Although these large pore size membranes can allow individual bacteria to pass through, they are effective to stop large biological floc from passing through the membrane. Therefore the activated sludge can be retained in the aeration tank. With the large pore size in the macrofiltration membranes, biofouling of membranes can be minimized and the trans-membrane pressure (TMP) can be kept at a low value which means the membrane would not foul even at very high permeate flux.

To avoid biofouling of the filters and to control the dissolved oxygen level in the aeration tank, two kinds of air diffusers are provided in this system: coarse bubble diffusers and fine bubble diffusers. The coarse bubble diffusers are mainly used to flush the membrane modules to avoid membrane fouling, while the fine bubble diffusers are mainly used to provide dissolved oxygen.

Depending on the material used for constructing the macrofiltration membranes, there may be a need to construct a honeycomb membrane module to house and fix the membrane in the aeration tank to facilitate proper backwashing and operation of the membrane.

To minimize sludge production, an anaerobic zone can be added to the process. This is implemented by transferring a portion of the mixed liquid from the aeration zone to an oxygen-free anaerobic zone. In addition, the process includes recycling the mixed liquid in the anaerobic zone back to the aeration zone. The membrane module provided in the aeration zone continues to be used for the separation of solids from the mixed liquid so as to form the treated effluent.

The process can also make use of sulfur compounds for minimizing sludge production. Sulfur compounds including sulfate, sulfite, thiosulfate, sulfide or elemental sulfur can be added to the system. Possible sulfur sources can be sulfate from seawater, saline sewage through seawater toilet flushing, or industrial wastewater such as acid mine drainage or effluent from desulfurization units of fossil fuel power stations.

In the aeration tank, the sulfur compounds will be oxidized to sulfate. Part of the sulfate will enter the anaerobic zone and act as the electron acceptor for oxidation of the organic carbon, forming carbon dioxide and sulfide. The sulfide will then be recycled back to the aeration tank for conversion to sulfate. Part of the sulfate will leave the system with the permeate through the membrane.

Depending on the sludge retention time (SRT) and hydraulic retention time (HRT), conversion of ammonia (originated in the wastewater) to nitrate through nitrification may occur in the aeration tank. Part of the nitrate formed would be transferred, following the bulk mixed liquid to the anaerobic zone where the nitrate will be reduced to nitrogen gas through denitrification. In this configuration, denitrification and sulfate reduction happen in the anaerobic zone, where 50% to 70% of the organic carbon oxidation to carbon dioxide occurs.

High dissolved oxygen level in the mixed liquid transferred to anaerobic zone may affect the performance of the anaerobic zone. Hence, the dissolved oxygen in aeration tank should be kept at a low level of about 2 mg/L.

The process affords a smaller footprint, higher nutrient removal efficiency, and lower membrane fouling frequency than previous wastewater treatment technologies. This is very suitable for land shortage areas such as Hong Kong and Singapore.

In a model plant, the membrane module used in this process is produced by Hong Kong University of Science and Technology (HKUST). The membranes were housed on a HKUST designed honeycomb module, in which the membrane is held between two thin corrosion-resistant honeycomb plates. The corrosion-resistant honeycomb plates support the membrane and keep the membrane in a flat shape, which enables a high efficiency of the membrane module and increases the efficiency of backwash. The plates and membrane are installed and fixed on the membrane frame by fasteners such as screws, nuts, and gaskets to enable a close fit for the membrane. This equipment forms an integrated HKUST membrane module which is installed into the aeration zone.

To identify the acceptable range of membrane pore size for the process, membranes having pore sizes between 0.5 µm and 220 µm have been tested for determination of the critical flux as well as observing the biomass accumulation on the membrane surface under a microscope.

Figure 3:
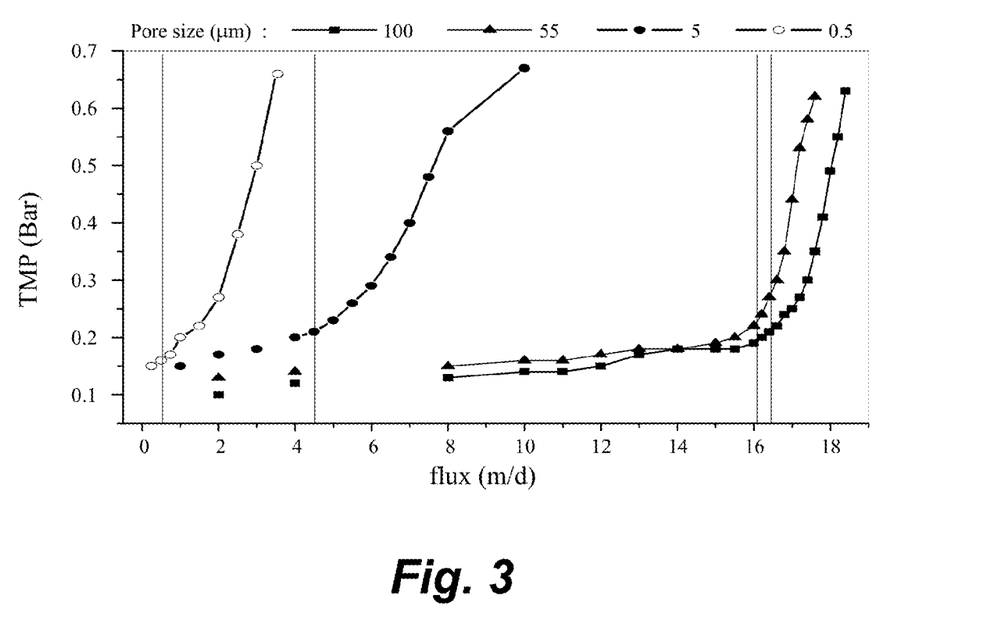
FIG. 3 is a graph showing the operational trans-membrane pressure (TMP) data in a sub-critical/critical flux of membranes with pore sizes of 0.5 μm, 5 μm, 55 μm and 100 μm.

Critical flux is an important parameter to indicate the maximum permeability and workload of a membrane in a MBR system. The membrane has to be operated below critical flux (i.e. in the sub-critical flux) to avoid membrane fouling. A higher critical flux means a smaller membrane is needed. The trans-membrane pressure (TMP) will increase significantly if the operational flux is higher than critical flux. The steady state TMP of the membrane operated under different flux is measured to determine the critical flux. FIG. 3 is a graph showing the operational trans-membrane pressure (TMP) data in a sub-critical and critical flux of membranes. FIG. 3 shows the result of the critical flux measurements with nominal pore sizes of 0.5 µm, 5 µm, 55 µm and 100 µm. It indicated that the critical flux will increase when the pore size increases, with pore size higher than 5 μm being acceptable, and with pore size higher than 55 μm optimal; with critical flux up to around 16 m³/m²d. These are considered nominal pore sizes because the size of individual pores varies significantly. The nominal pore sizes are rough averages of the pore size as produced by the manufacturer.

Figure 4A:
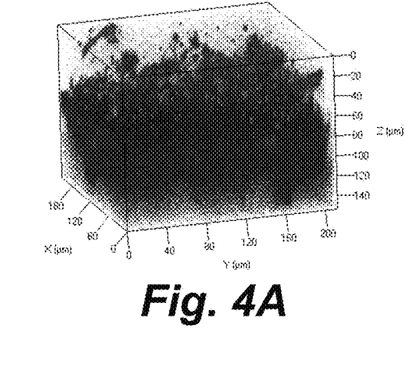
FIG. 4a depicts a sample with a 0.5 μm pore size.
Figure 4B:
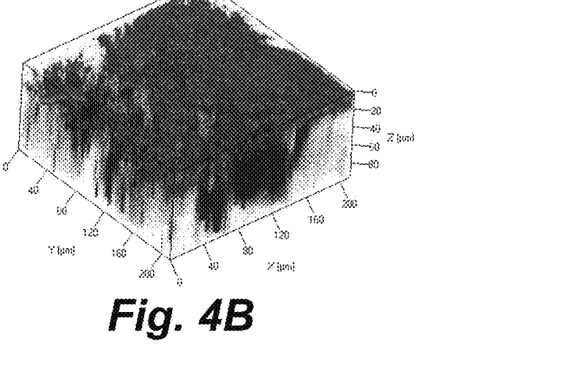
FIG. 4b depicts a sample with a 5 μm pore size.
Figure 4C:
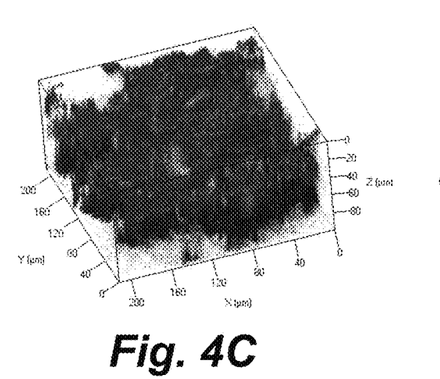
FIG. 4c depicts a sample with a 55 μm pore size.
Figure 4D:
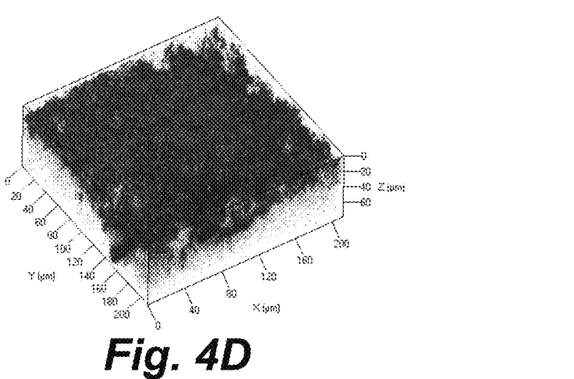
FIG. 4d depicts a sample with a 100 μm pore size.
Figure 4E:
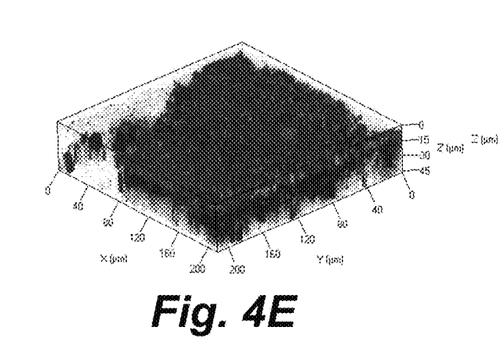
FIG. 4e depicts a sample with a 150 μm pore size.
Figure 4F:
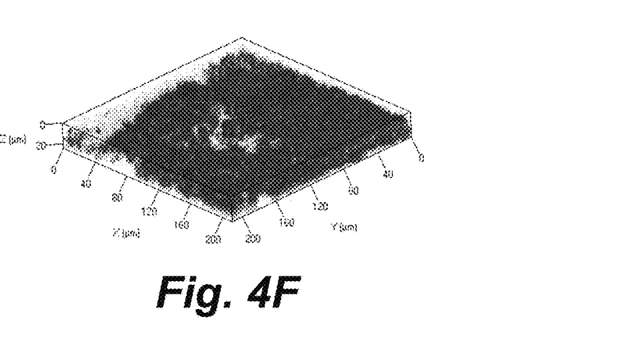
FIG. 4f depicts a sample with a 220 μm pore size.

FIGS. 4a-4f are diagrams showing the biomass accumulated on the surface of the membranes with pore sizes from 0.5 μm to 220 μm, viewed under a Confocal Laser Scanning Microscope. FIGS. 4a-4f show the biomass accumulated the membrane observed under the microscope. FIG. 4a depicts a sample with a 0.5 μm pore size; FIG. 4b depicts a sample with a 5 μm pore size; FIG. 4c depicts a sample with a 55 μm pore size; FIG. 4d depicts a sample with a 100 μm pore size; FIG. 4e depicts a sample with a 150 μm pore size; FIG. 4f depicts a sample with a 220 μm pore size. The thicker the biomass accumulated on the membrane, the more efficient is the membrane in filtering out the biomass from the permeate. The photos indicated that membrane with pore size larger than 220 μm was inefficient in retaining the biomass on the membrane surface. This also confirms with our observations that the effluent would become very turbid when the pore size is larger than 220 μm. Based on the results of these two tests, the acceptable pore size is between 5 μm and 150 μm, with the optimum pore size as 55 μm. The pore size is a nominal value in that it is likely that a given membrane will have a variety of pore sizes, depending on construction techniques. The nominal pore size can be in the range of 5 μm to 150 μm or 10 μm to 100 μm. A single membrane can have pores of different sizes which include pores within the stated range, or can have pores within a narrow range of pore sizes in the previously-mentioned ranges.

Configuration of the MEPT Plant

Figure 5:
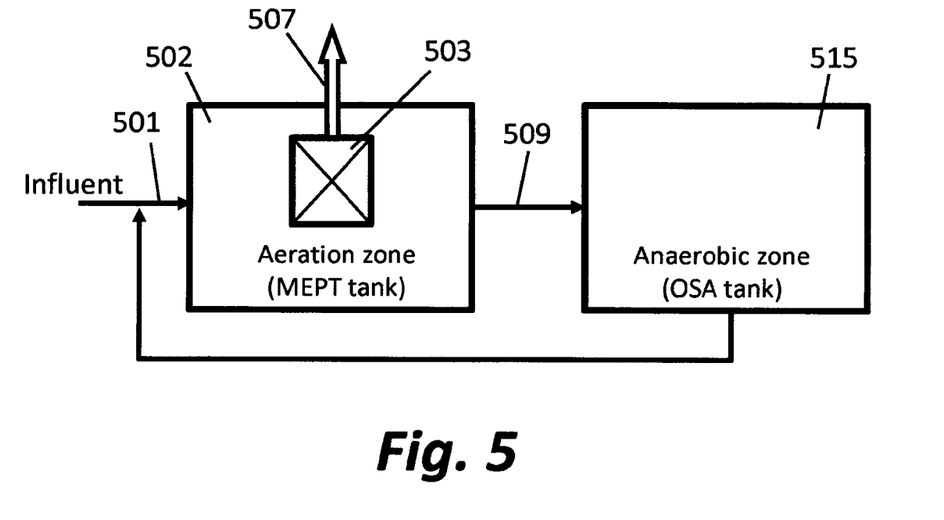
FIG. 5 is a schematic diagram illustrating a complete MEPT-OSA reactor.

FIG. 5 is a schematic diagram illustrating an improved wastewater treatment system. Depicted are influent supply conduit 501, aeration zone or tank (MEPT tank) 502, membrane module 503 with membrane module outlet pipe 507, aeration to anaerobic connection pipe 509, and Oxic-Settling-Anaerobic (OSA) tank 515. OSA tank 515 establishes an anaerobic zone.

Referring to FIG. 5, the configuration employs a complete mixing system for treating organic matter and nitrogen-containing wastewater. Wastewater, before entering the system, should first pass through grit removal and screening of 3 mm, but there is no need for suspended solids removal. The wastewater is then fed through a conduit 501 into MEPT tank 502 with a continuous oxygen surplus.

The oxygen surplus in the aeration zone is such that the rate of oxygen supply is equal to the rate of oxygen consumption by the microorganisms in the tank. This results in dissolved oxygen concentration at about 2 mg/L throughout the tank.

Aerator devices or a combination of aerator devices and mechanical mixers typically provide oxygen and keep the mixed liquid solids in suspension. Using oxygen supplemented by the aerators or mixers in the aeration tank, heterotrophic organisms oxidize organic carbon to carbon dioxide and autotrophic organisms oxidize ammonia to nitrate, as well as the hydrogen sulfide, contained in the mixed liquid which recycled from OSA tank 515, to sulfate. The hydraulic retention time in MEPT tank 502 is typically, but not limited to, 1.5 to 2 hours. The mixed liquid suspended solids in MEPT tank 502 is about, but not limited to, 3000 mg/L.

Figure 6:
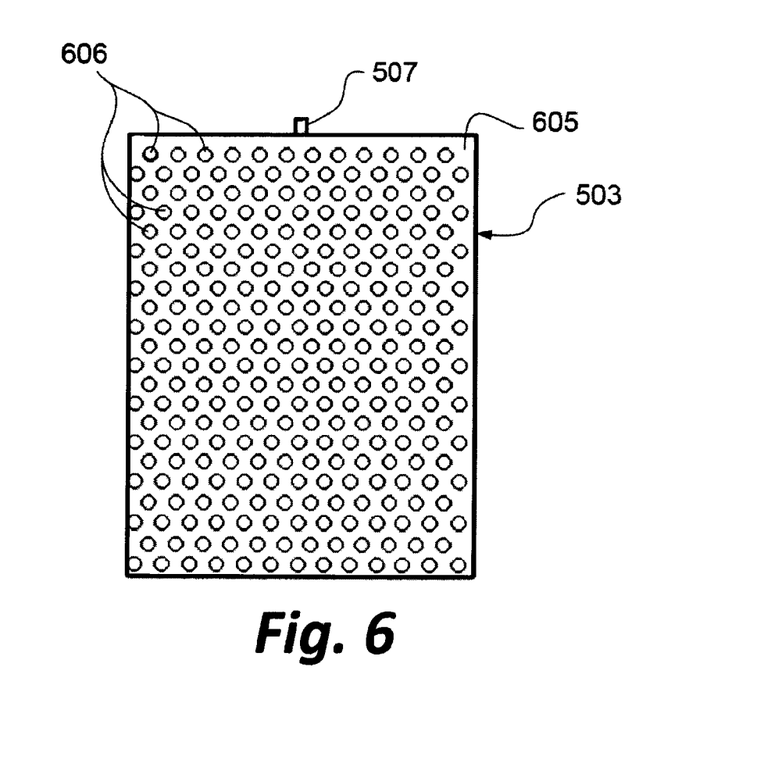
FIG. 6 is a schematic diagram showing a side elevation of one embodiment of a membrane module.

FIG. 6 is a schematic diagram showing a side elevation of one embodiment of a membrane module 503. Depicted are module 503, with outlet 507 and corrosion-resistant honeycomb plates 605 (one shown). Honeycomb plates 605 have honeycombed openings 606 with hole size of 10 mm. The hole size for openings 606 is selected according to the requirements of structural integrity of the honeycomb plate 605 and for supporting the membrane (717, FIG. 7) within the module 503. One or more membrane modules 503 are installed in MEPT tank 502 where permeate passes through the membrane filters within the modules 503 as effluent while the biological solids are separated by membrane filters and left behind in the MEPT tank 502. Membrane modules 503 need a significant amount of air bubbles not only for supplying oxygen to the microorganisms but also for membrane scouring in order to avoid membrane fouling.

Part of the mixed liquid from MEPT tank 502 then flows to OSA tank 515 through a connection pipe 509. In OSA tank 515, nitrate and sulfate contained in the mixed liquid from MEPT tank 502 acts as electron acceptors and reduce to nitrogen gas and sulfide by oxidizing organic carbon to carbon dioxide. Part of the nitrate may also act as electron acceptor to oxidize sulfide through autotrophic denitrification. The same amount of mixed liquid in OSA tank 515 is then recycled back to MEPT tank 502. The hydraulic retention time in OSA tank 515 is typically, but not limited to, 1.5 to 2 hours. The mixed liquid suspended solids concentration in OSA tank 515 is about, but not limited to, 3000 mg/L.

The Membrane Enhanced Primary Treatment (MEPT) Reactor

Membrane Bioreactor (MBR) systems combine biological treatment, involving bacteria (referred to as activated sludge), with membrane separation to treat wastewater. Wastewater, after passing through grit removal, screening and primary sedimentation, enters an aeration tank filled with activated sludge and fitted with air diffusers for providing oxygen and scouring of the membranes. Treated effluent is separated from the sludge by passing through the membrane in the form of permeate. MBR typically employ flat sheet or hollow fiber membrane modules submerged in the aeration tank.

MEPT tank 502 of the wastewater treatment system resembles a MBR without primary sedimentation. The membrane used in the MEPT has a nominal pore size of 55 μm, called as macrofiltration membranes. Wastewater, after passing through screening enters the aeration tank through feeding pumps and pipes. The effluent is taken out of the reactor by applying a vacuum to the membrane modules to withdraw the permeate through the membranes. Course gas bubbles are supplied such that, in use, the coarse bubbles move past the membrane surface are entrained or mixed with a liquid flow and scoured against the membrane surface. The course gas bubbles function to dislodge fouling materials from the membrane surface.

In this system, a further source of aeration can be provided within the tank to assist microorganism activity. This kind of source is provided by fine bubbles. The combined use of aeration for both degrading of organic substances and membrane cleaning, together with the specific macrofiltration membranes, has been shown to enable constant filtrate flow with significant increase in TMP under a very high flux up to 16 m³/m²d. The membrane module is therefore used to establish a flux across the membrane of between 2 and 16 m³/m²d.

The MEPT process can be used to provide an effective treatment of domestic or industrial wastewater and to provide effluent resembling secondary treatment plus nitrification. This type of submerged membrane process uses membrane modules immersed in an aeration tank. The submerged membrane allows the MEPT process to combine primary treatment, biological treatment and physical separation of sludge in one stage, so that the membrane bioreactor is compact, efficient, economical, and versatile.

The Membrane Modules

Membrane modules 503 used in this system are produced in HKUST. Referring to FIG. 6, the type of the membrane module is flat sheet with the length-to-width-to-thickness 7:4.3:0.25. Corrosion resistant honeycomb plates 605 are fixed onto the membrane module 503 surfaces symmetrically with holes 606 of 10 mm diameter and spacing of 20 mm between centers. Outlet 507 for effluent from membrane module 503 is installed on the top of membrane module 503.

Figure 7:
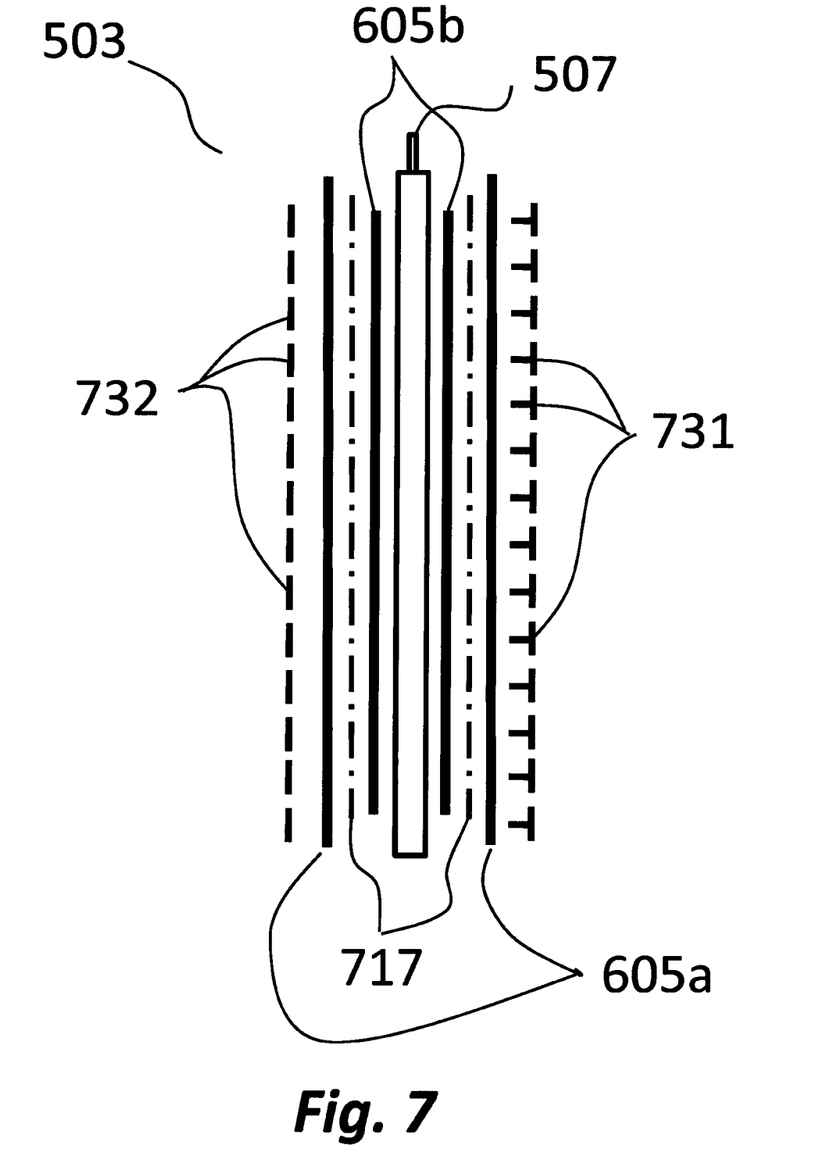
FIG. 7 is a diagram illustrating construction details of a membrane module.

FIG. 7 is a diagram illustrating construction of a membrane module 503. Depicted are two membranes 717, each held by two thin corrosion-resistant honeycomb plates 605a, 605b, and fasteners, 731, 732, such as nut and bolt fasteners used for tightening plates 605a, 605b against membrane 717, which is held between two plates 605a and 605b. The membrane 717 used is a non-woven fabric flat sheet membrane with nominal pore size ranged from 5 μm to 150 μm, with optimum pore size of 55 μm. All the pore size in this range could be used in this MEPT process.

The thin corrosion-resistant honeycomb plates 605a, 605b are used to hold membrane 717 so that the membrane shape does not change during operation, and thereby maintains membrane module 503 at a high level of stability." In the MEPT system, permeate flux is more than 10 times larger than traditional membrane bioreactor and backwash flux is even larger than permeate flux. Therefore, membrane 717 must be held in a fixed position tightly by the honeycomb plates 605a, 605b in membrane module 503 in order to avoid changes in shape of membrane 717. The thin corrosion-resistant honeycomb plates 605a, 605b used in this system are 1 mm thick which could provide the efficiency of air bubble flushing and control bio-cake growth on the membrane surface. The bolts and nuts 731, 732 are installed through the whole membrane module 503 from the front side to the reverse side (or vice-versa). The distance between each bolt is 50 mm which results in membrane 717 being closely fitted within membrane module 503.

The membrane bioreactor system utilizes an effective and efficient membrane cleaning method. Commonly used physical cleaning methods include backwash using effluent and scouring using coarse bubbles in the mixed liquid. In the example shown below, chemical or off-tank cleaning is not needed. The backwash using 1% effluent is conducted twice a day, and trans-membrane pressure (TMP) is typically below 0.09 bars after a 1 min. backwash.

Aeration Zone

Figure 8:
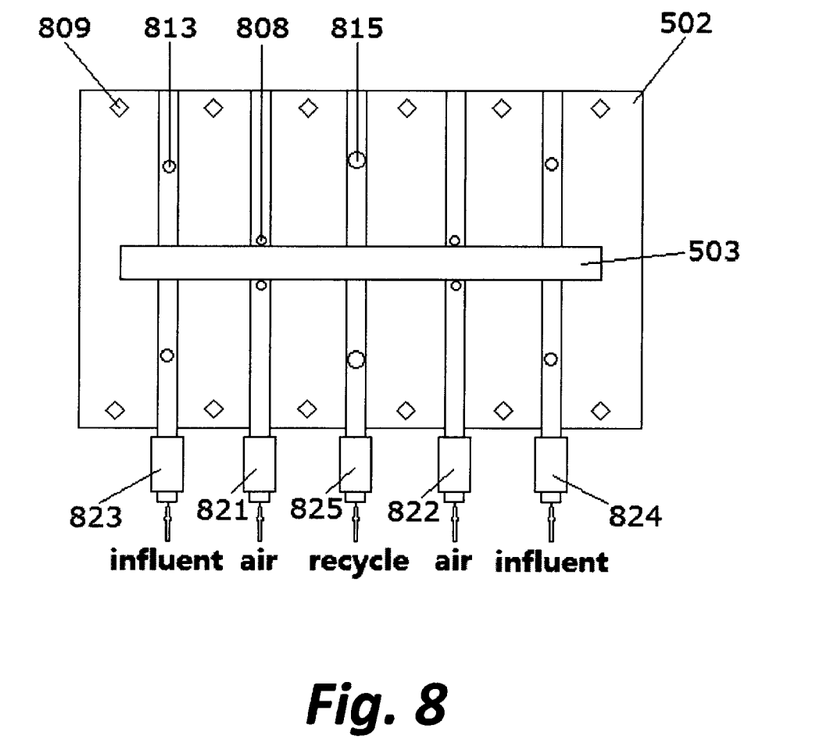
FIG. 8 is a diagram showing a plan view of aeration zone (MEPT tank) and illustrates the distribution of aeration diffusers and inflow of influent and recirculation.

FIG. 8 is a diagram showing a plan view schematic of aeration zone (MEPT tank 502) and illustrates the distribution of aeration diffusers and inflow of influent and recirculation, and illustrates the distribution of aeration diffusers and inflow of influent and recirculation. Depicted are MEPT tank 502, membrane module 503, aeration holes 808, air diffusers 809, holes 813 for influent, holes 815 for recycled mixed liquid, and valves 821-825. Aeration holes 808 having a diameter 5 mm for producing coarse bubbles are designed on the bottom of MEPT tank 502 and positioned on both sides of membrane module 503 where scouring membrane module 503 can be quite effectively performed. Air diffusers 809 are installed evenly in MEPT tank 502 to provide dissolved oxygen symmetrically in the tank. Influent and recycled mixed liquid from OSA tank 515 flow into MEPT tank 502 from the bottom of the tank in order to guarantee a desired hydraulic retention time (HRT). Holes 813 having a diameter 8 mm are used for influent while holes 815 having a diameter 10 mm are used for recycled mixed liquid. Valves 821-825 installed externally to MEPT tank 502 are controlled by a programmable logic controller (PLC) panel.

The Oxic-Settling-Anaerobic (OSA) Tank

The anaerobic tank (OSA tank) 115 of the wastewater treatment system is a sludge minimizing reactor. As the heterotrophic oxidation reaction using oxygen or nitrate has a sludge yield coefficient 0.4 g VSS/g COD, which is much higher than the yield coefficient 0.1 g VSS/g COD for anaerobic methanogenic reactions, diversion of the mixed liquid or sludge from the aeration tank to the anaerobic tank to facilitate anaerobic methanogenic reactions can reduce the overall sludge production. However, as the reaction rate of methanogenic reaction is much slower than heterotrophic oxidation, such reaction requires a very long HRT and SRT to remove enable sludge minimization efficiently. As MBR process can be operated with a higher sludge concentration than conventional activated sludge process, the OSA process can be added to the MBR process without applying secondary sedimentation.

On the other hand, as part of the nitrate in the aeration tank will also enter the anaerobic zone, heterotrophic denitrification would occur in the anaerobic zone. However, as this reaction has a high sludge yield factor, the sludge minimization effect of the OSA reactor would be reduced.

Hong Kong sewage contains 500 $mgSO_4^{2-}$/L sulfate or 167 mgS/L and 400 mg/L COD, indicating a sufficient sulfate reduction potential. As sulfate reduction reaction also has a low sludge yield 0.2 g VSS/g reduced sulfate, it provides an opportunity for sludge minimization using the sulfur cycle. Moreover, as sulfate-reducing bacteria (SRB) have a higher specific growth rate and lower Monod's saturation coefficient than that of methane producing bacteria, they can out-compete methane producing bacteria for degradation of organic substrates, making them suitable for OSA applications. Furthermore, as autotrophic denitrification by sulfide also have a very low sludge yield, the sludge minimization rate with sulfate will not be affected by the nitrate level.

Reduction of sulfate to sulfide is a change from a strong acid to a weak acid, which would result in the increase in pH. In a closed anaerobic environment, sulfide generated from sulfate reduction tends to dissolve in water as pH increases, thereby generating adequate amounts of dissolved sulfide, enable it to be re-circulated to the aeration tank where it would be oxidized by oxygen to sulfate through autotrophic sulfide oxidation. As this process also has a low sludge yield factor, the sludge production rate of the system would be minimized by this sulfate-sulfide-sulfate cycle.

Figure 9:
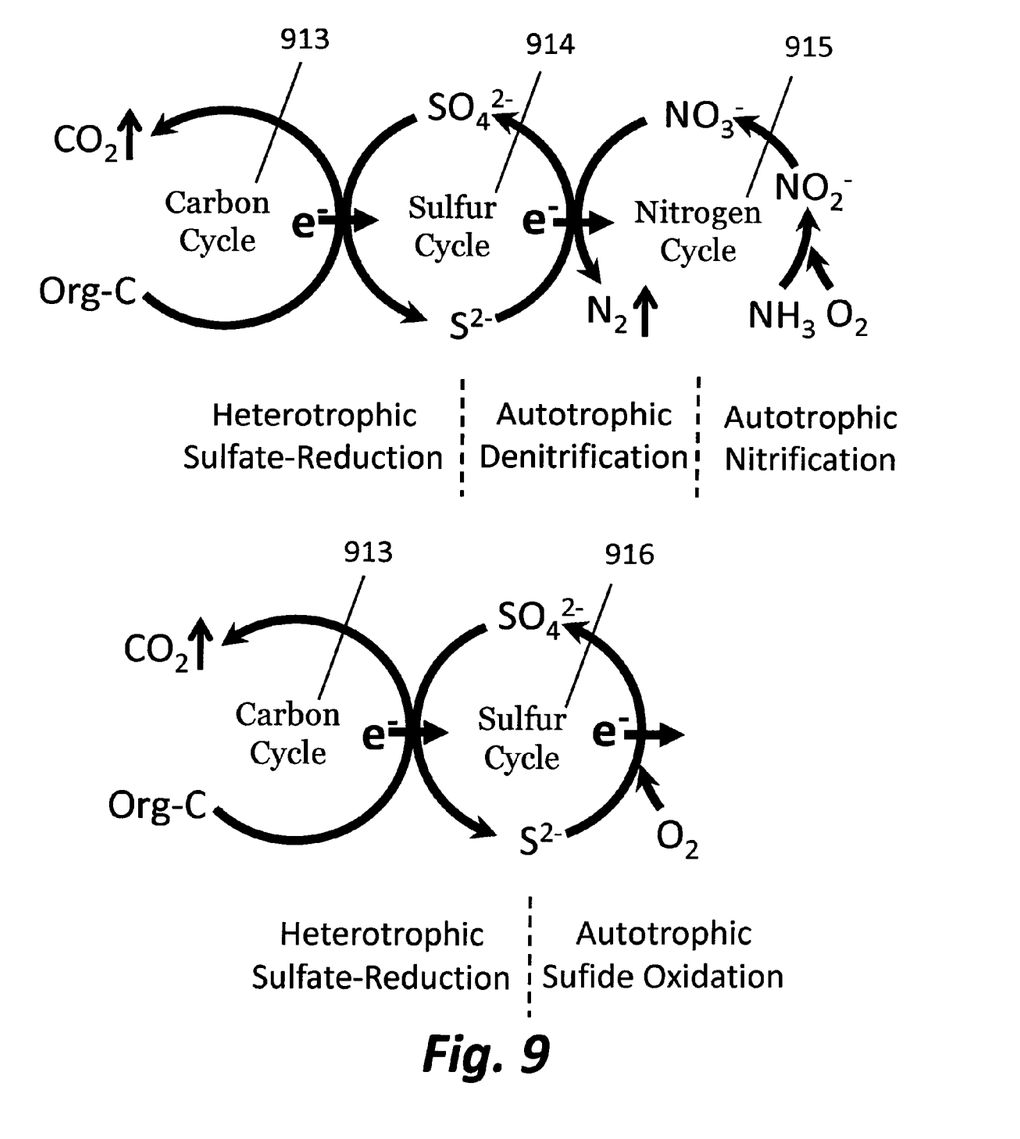
FIG. 9 is a diagram showing a mechanism of reactions in aerobic and anaerobic zones, using sulfur as the electron carrier.

FIG. 9 is a diagram showing a mechanism of reactions in the aerobic zone (MEPT tank 502) and anaerobic zone (OSA tank 515) involving sulfur. Depicted are representations of a carbon cycle, described as "heterotrophic sulfur reduction" 913, a sulfur cycle described as "autotrophic denitrification" 914, a nitrogen cycle described as "autotrophic nitrification" 915, and another sulfur cycle described as "autotrophic sulfide oxidation" 916. The process results in reactions involving the three elements, carbon, nitrogen and sulfur. The portion of organic carbon not consumed in MEPT tank 502, organic carbon in the form of bacterial mass, nitrate which is produced from oxidizing ammonia in MEPT tank 502 through autotrophic nitrification 915, and sulfate originated from the sewage are pumped into OSA tank 515.

These are the main sources of the three elements.

In the OSA tank 515, organic carbon provides electrons to achieve sulfate reduction and is oxidized to carbon dioxide, while sulfate is reduced to sulfide by sulfate reducing bacteria through heterotrophic sulfate reduction 913. Nitrate is reduced to nitrogen gas through two competitive reactions, namely autotrophic denitrification 914 oxidizing sulfide to sulfate, or heterotrophic denitrification oxidizing organic carbon to carbon dioxide.

The mixed liquid recycled to MEPT tank 502 contains dissolved sulfide which will be oxidize to sulfate again by oxygen through autotrophic sulfide oxidation 916 in MEPT tank 502. Part of the organic carbon will also be oxidized by oxygen to carbon dioxide in MEPT tank 502.

This process significantly reduces excess sludge production because the three major microbial populations in the process—sulfate reduction bacteria, autotrophic denitrifiers and autotrophic nitrifiers—all have low growth yields. Growth yields are a function of the bacterial growth rate. The lower growth yield is, the less bacterial mass will produce per unit substrate (e.g. carbon) consumed. Low growth yield is therefore beneficial for the biological sewage treatment process in minimizing sludge production.

Example of the MEPT-OSA Operation

We have operated the MEPT-OSA Reactor for 4 months with an influent of screened saline wastewater at 2.7 m$^3$/day without passing through primary sedimentation. The membrane used is a non-woven fabric membrane with nominal pore size of 55 μm. The size of membrane modules is 0.7 m×0.43 m×0.025 m with a porosity of 0.42. The size of the aeration tank is 0.38 m×0.54 m×0.97 m and the size of anaerobic tank is 0.4 m×0.4 m×1.25 m. The total volume of the system is 400 L, with each of the reactor roughly equals to 200 L. The total HRT is 3.5 hrs while SRT is 36 days. The influent entered the aeration tank. Part of the mixed liquid of the aeration tank then entered the anaerobic tank with a recirculation rate equal to the influent inflow rate. The air-to-water ratio in aeration tank was around 20-25 (m$^3$/m$^3$) while mixed liquid in the anaerobic tank was mixed with a mechanical mixer operating at 40-60 rpm/min. The average MLSS in both the aeration tank and anaerobic tank are 3000-3500 mg/L. The permeate flux of this example was maintained at 10.8 to 11 m$^3$/m$^2$ day. Membrane backwash was conducted every 12 hours. Under these operational conditions, stable effluent with turbidity less than 10 NTU, SS less than 20 mg/L, COD less than 50 mg/L, and ammonia less than 5 mg/L can be achieved. During the entire operation period, no membrane fouling happened as TMP was always below 0.2 bars before backwash and decreases to 0.09 bars after backwash. No chemical or off-tank cleaning of the membrane has been performed.

CONCLUSION

All numbers expressing quantities of ingredients, reaction conditions, and so forth used in the specification and claims are given by way of example, and are to be understood as being modified in all instances by the term "about". Accordingly unless indicated to the contrary, the numerical parameters set forth in the specification and attached claims are approximations that may vary depending upon the desired properties sought to be obtained by the present disclosure.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A process for treating organic matter and nitrogen contained in wastewater in an aeration zone with a membrane module maintaining in a high flux operation condition, the process comprising:
    providing an aeration zone fitted with aerators and filled with liquid comprising a mixture of bacteria and influent wastewater to form a mixed liquid;
    providing the membrane module in the aeration tank comprising at least one macrofiltration membrane having a pore size of 5 μm to 150 μm, thereby providing a large pore size membrane which allows passage of treated wastewater at a high flux, while effectively stopping passage of large biological floc to retain activated sludge in the aeration tank as unfiltered activated sludge, the pore size minimizing biofouling of the membrane, the membrane held in a fixed position in a flat shape by corrosion-resistant supports at the membrane module in a manner to provide and control bio-cake growth on a surface of the membrane, wherein the membrane module comprises a membrane bioreactor that establishes a flux of the membrane bioreactor of between 2 and 16 m$^3$/m$^2$d and providing a transmembrane pressure (TMP) kept at a low value of below 0.2 bar, and further reduced by backwashing the membrane, thereby reducing a tendency of the membrane to foul even at very high permeate flux;
    providing wastewater influent to the aeration zone;
    maintaining an oxygen surplus, sufficient for biological treatment by aerobic bacterial microorganisms, by controlling a rate of oxygen supplied to the aeration zone;
    processing the mixed liquid in the aeration zone by:
        filtering a first portion of the mixed liquid through the membrane to form a permeate as the treated effluent and leaving the residual part as the unfiltered activated sludge remaining suspended in the aeration zone,
        transferring a second portion of the mixed liquid from the aeration zone to an anaerobic zone, and
        mixing the second portion of the mixed liquid from the aeration zone with liquid present in the anaerobic zone to provide mixed liquid in the anaerobic zone; and
    transferring liquid mixed in the anaerobic zone from the anaerobic zone to the aerobic zone,
    wherein the aerator further comprises a membrane cleaning function using aeration bubbles to agitate the membrane to maintain a non-fouling condition of the membrane module in a high flux operation condition, further reducing a tendency of the membrane to foul even at very high permeate flux.

2. The process according to claim 1, further comprising, in the aeration zone, performing at least one of the oxidation processes selected from the group consisting of:
    oxidation of organic carbon to carbon dioxide;
    oxidation of sulfide to sulfate; and
    oxidation of ammonia to nitrate by autotrophic denitrification.

3. The process according to claim 1, further comprising, in the anaerobic zone, performing at least one of the processes selected from the group consisting of:
    reduction of sulfate to sulfide by oxidizing organic carbon to carbon dioxide;
    autotrophic denitrification using sulfide to reduce nitrate to nitrogen gas, and heterotrophic denitrification using organic carbon to reduce nitrate to nitrogen gas.

4. The process according to claim 1, further comprising the provision of sulfide and sulfate through at least one of the group consisting of addition to one of liquids of seawater, addition to one of liquids of saline wastewater, and, in the case of the wastewater not containing sulfate or sulfite, addition to one of the liquids of sulfur selected from the group consisting of sulfate, sulfite, thiosulfates, sulfide and elemental sulfur.

5. The process according to claim 1, further comprising using, as the membrane, a membrane having a construction comprising a material selected from the group consisting of non-woven fabric, plastic, polymer, metal, ceramic, fiber glass or thin film composites.

6. The process according to claim 1, further comprising using a high flux membrane module, comprising a sheet type non-woven material membrane embedded therein, and fixed by the corrosion-resistant supports, in the aeration zone.

7. The process according to claim 1, further comprising maintaining a trans-membrane pressure across the membrane modules in the aeration tank below 0.2 bar.

8. Wastewater treatment apparatus comprising:
an aeration zone receiving wastewater influent and mixing the wastewater influent with activated sludge to form a first mixed liquor;
a membrane module inside the aeration zone using at least one non-woven fabric macrofiltration membrane with pore sizes of 5 µm to 150 µm, thereby providing a large pore size membrane which allows passage of treated wastewater at a high flux, while effectively stopping passage of large biological floc to retain activated sludge in the aeration tank as unfiltered activated sludge, the pore size minimizing biofouling of the membrane, the membrane held in a fixed position in a flat shape by corrosion-resistant supports at the membrane module in a manner to provide and control bio-cake growth on a surface of the membrane, wherein the membrane module comprises a membrane bioreactor that establishes a flux of the membrane bioreactor of between 2 and 16 $m^3/m^2 d$ and providing a trans-membrane pressure (TMP) kept at a low value of below 0.2 bar, and further reduced by backwashing the membrane, thereby reducing a tendency of the membrane to foul even at very high permeate flux;
an aerator maintaining an oxygen surplus, sufficient for biological treatment by aerobic bacterial microorganisms, by controlling a rate of oxygen supplied to the aeration zone; and
a split processing section provided for processing the first mixed liquor by:
filtering a first portion of the first mixed liquor to form a permeate and leaving the residual part as unfiltered activated sludge,
mixing the unfiltered activated sludge with the activated sludge in the aeration zone,
transferring a second portion of the first mixed liquor unfiltered activated sludge from the aeration zone to an anaerobic zone, and
mixing the second portion of first mixed liquor unfiltered activated sludge with sludge in the anaerobic zone to form a second mixed liquor; and
recycling a portion of the second mixed liquor to the aerobic zone,
wherein the aerator further comprises a membrane cleaning function using aeration bubbles to agitate the membrane to maintain a non-fouling condition of the membrane module in a high flux operation condition, further reducing a tendency of the membrane to foul even at very high permeate flux.

9. The apparatus according to claim 8, further comprising the apparatus configured for providing sulfide and sulfate through at least one of the group consisting of addition to one of liquids of seawater, addition to one of liquids of saline wastewater, and, in the case of the wastewater not containing sulfate or sulfite, addition to one of the liquids of sulfur selected from the group consisting of sulfate, sulfite, thiosulfates, sulfide and elemental sulfur.

10. The apparatus according to claim 8, wherein the aeration zone promotes at least one of the oxidation processes selected from the group consisting of:
oxidation of organic carbon to carbon dioxide;
oxidation of ammonia to nitrate by an autotrophic nitrification; and
oxidation of sulfide to sulfate.

11. The apparatus according to claim 8, wherein the anaerobic zone promotes at least one of the processes selected from the group consisting of:
reduction of sulfate to sulfide by oxidation of organic carbon to carbon dioxide;
reduction of nitrate to nitrogen gas by autotrophic denitrification using sulfate; and
reduction of nitrate to nitrogen gas by heterotrophic denitrification using organic carbon.

12. The apparatus according to claim 8, wherein the membrane bioreactor comprises, as the membrane module, a high flux and non-fouling membrane module.

13. Wastewater treatment apparatus comprising:
an aeration zone receiving wastewater influent and mixing the wastewater influent with activated sludge;
a membrane module using at least one non-woven fabric macrofiltration membrane with pore sizes of 5 µm to 150 µm, thereby providing a large pore size membrane which allows passage of treated wastewater at a high flux, while effectively stopping passage of large biological floc to retain activated sludge in the aeration tank as unfiltered activated sludge, the pore size minimizing biofouling of the membrane, the membrane maintained as a flat sheet, wherein the membrane module comprises a membrane bioreactor that establishes a flux of the membrane bioreactor of between 2 and 16 $m^3/m^2 d$ and providing a trans-membrane pressure (TMP) kept at a low value of below 0.2 bar, and further reduced by backwashing the membrane, thereby reducing a tendency of the membrane to foul even at very high permeate flux;
an aerator maintaining an oxygen surplus, sufficient for biological treatment by aerobic bacterial microorganisms, by controlling a rate of oxygen supplied to the aeration zone, the aerator further comprises a membrane cleaning function using aeration bubbles to agitate the membrane to maintain a non-fouling condition of the membrane module in a high flux operation condition, further reducing a tendency of the membrane to foul even at very high permeate flux; and
a pump to draw a portion of the mixed liquid through the membrane to form a permeate as the treated effluent.

14. The apparatus according to claim 13, wherein the membrane bioreactor comprises, as the membrane module, a high flux and non-fouling membrane module.

15. The apparatus according to claim 13, wherein the membrane bioreactor maintains a trans-membrane pressure across the membrane modules in the aeration zone below 0.2 bar.

16. Wastewater treatment apparatus comprising:

an aeration zone receiving wastewater influent and mixing the wastewater influent with activated sludge to form a first mixed liquor;

a membrane module inside the aeration zone using at least one non-woven fabric macrofiltration membrane with pore sizes of 5 µm to 150 µm, thereby providing a large pore size membrane which allows passage of treated wastewater at a high flux, while effectively stopping passage of large biological floc to retain activated sludge in the aeration tank as unfiltered activated sludge, the pore size minimizing biofouling of the membrane, the membrane held in a fixed position in a flat shape by corrosion-resistant supports at the membrane module in a manner to provide and control bio-cake growth on a surface of the membrane, wherein the membrane module comprises a membrane held between the corrosion-resistant supports and fixed on a membrane frame by fasteners to enable a close fit for the membrane to support the membrane and keep the membrane in said flat shape;

the membrane maintained at a trans-membrane pressure (TMP) kept at a low value of below 0.2 bar, and further reduced by backwashing the membrane, thereby reducing a tendency of the membrane to foul even at very high permeate flux;

an aerator maintaining an oxygen surplus, sufficient for biological treatment by aerobic bacterial microorganisms, by controlling a rate of oxygen supplied to the aeration zone; and a split processing section provided for processing the first mixed liquor by:

filtering a first portion of the first mixed liquor to form a permeate and leaving the residual part as unfiltered activated sludge, mixing the unfiltered activated sludge with the activated sludge in the aeration zone, transferring a second portion of the first mixed liquor unfiltered activated sludge from the aeration zone to an anaerobic zone, and mixing the second portion of first mixed liquor unfiltered activated sludge with sludge in the anaerobic zone to form a second mixed liquor; and recycling a portion of the second mixed liquor to the aerobic zone, wherein the aerator further comprises a membrane cleaning function using aeration bubbles to agitate the membrane to maintain a non-fouling condition of the membrane module in a high flux operation condition, further reducing a tendency of the membrane to foul even at very high permeate flux.

17. The apparatus according to claim 16, further comprising the apparatus configured for providing sulfide and sulfate through at least one of the group consisting of addition to one of liquids of seawater, addition to one of liquids of saline wastewater, and, in the case of the wastewater not containing sulfate or sulfite, addition to one of the liquids of sulfur selected from the group consisting of sulfate, sulfite, thiosulfates, sulfide and elemental sulfur.

18. The apparatus according to claim 16, wherein the aeration zone promotes at least one of the oxidation processes selected from the group consisting of:
oxidation of organic carbon to carbon dioxide;
oxidation of ammonia to nitrate by an autotrophic nitrification; and
oxidation of sulfide to sulfate.

19. The apparatus according to claim 16, wherein the anaerobic zone promotes at least one of the processes selected from the group consisting of:
reduction of sulfate to sulfide by oxidation of organic carbon to carbon dioxide;
reduction of nitrate to nitrogen gas by autotrophic denitrification using sulfate; and
reduction of nitrate to nitrogen gas by heterotrophic denitrification using organic carbon.

20. The apparatus according to claim 16, wherein the membrane bioreactor comprises, as the membrane module, a high flux and non-fouling membrane module.

* * * * *